(12) United States Patent
Morris

(10) Patent No.: US 11,599,732 B2
(45) Date of Patent: Mar. 7, 2023

(54) TUNABLE SYSTEM FOR MONITORING THREATS TO THIRD-PARTIES

(71) Applicant: Bank of America Corporation, Charlotte, NC (US)

(72) Inventor: Courtney Morris, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 377 days.

(21) Appl. No.: 16/744,375

(22) Filed: Jan. 16, 2020

(65) Prior Publication Data

US 2021/0224487 A1     Jul. 22, 2021

(51) Int. Cl.
| | |
|---|---|
| *G06F 17/00* | (2019.01) |
| *G06F 40/40* | (2020.01) |
| *G06F 16/28* | (2019.01) |
| *G06N 5/02* | (2023.01) |
| *G06F 40/284* | (2020.01) |

(52) U.S. Cl.
CPC ............ *G06F 40/40* (2020.01); *G06F 16/288* (2019.01); *G06N 5/02* (2013.01); *G06F 40/284* (2020.01)

(58) Field of Classification Search
CPC .......... G06F 40/30; G06F 16/353; G06N 5/04
USPC ............................................................. 704/9
See application file for complete search history.

(56) References Cited

U.S. PATENT DOCUMENTS

| | | |
|---|---|---|
| 1,026,199 A | 5/1912 | Bullard |
| 7,046,138 B2 | 5/2006 | Webb, Sr. |
| 8,887,286 B2 | 11/2014 | Dupont et al. |
| 9,282,070 B2 | 3/2016 | Haugen et al. |
| 9,471,883 B2 | 10/2016 | Chatterjee et al. |
| 10,007,661 B2 | 6/2018 | Arquero et al. |
| 10,031,909 B2 | 7/2018 | Blaschak et al. |
| 10,050,926 B2 | 8/2018 | Ebersman et al. |
| 10,313,520 B2 | 6/2019 | Dwyer et al. |
| 10,353,898 B2 | 7/2019 | Kawecki, III |
| 10,404,784 B2 | 9/2019 | Parthasarathi et al. |
| 10,438,207 B2 | 10/2019 | Subhedar et al. |
| 2014/0337257 A1 | 11/2014 | Chatterjee et al. |

(Continued)

OTHER PUBLICATIONS

"Third-Party Risk," https://www.fdic.gov/regulations/resources/director/presentations/dallas/2013-Third-Party-Risk.pdf, FDIC, 2013-2014 Banker Outreach.

*Primary Examiner* — Paul C McCord
(74) *Attorney, Agent, or Firm* — Weiss & Arons LLP

(57) ABSTRACT

A tunable monitoring system for detecting computer threats to third-parties is provided. The system may include a receiver operable to receive entity characteristics relating to a first entity and identification data identifying a third-party. The system may include a publicly-available data crawler operable to mine and retrieve publicly-available data. The data may relate to both the third-party and one or more of a plurality of entities. The plurality of entities may include entities that share a predetermined threshold number of entity characteristics with the first entity. The system may include a sentiment analysis module operable to score the retrieved data using a sentiment analysis scoring model. A potential relationship between the first entity and third-party may be dissolved when the score is above a predetermined negativity threshold. The potential relationship between the first entity and the third-party may be initiated when the score is below the predetermined negativity threshold.

13 Claims, 17 Drawing Sheets

(56) References Cited

U.S. PATENT DOCUMENTS

| | | | |
|---|---|---|---|
| 2016/0248800 A1* | 8/2016 | Ng | G06Q 40/06 |
| 2016/0300135 A1* | 10/2016 | Moudy | G06F 40/20 |
| 2017/0185921 A1 | 6/2017 | Zhang | |
| 2018/0089171 A1 | 3/2018 | Arquero et al. | |
| 2018/0176380 A1* | 6/2018 | McCoy | H04L 51/20 |

* cited by examiner

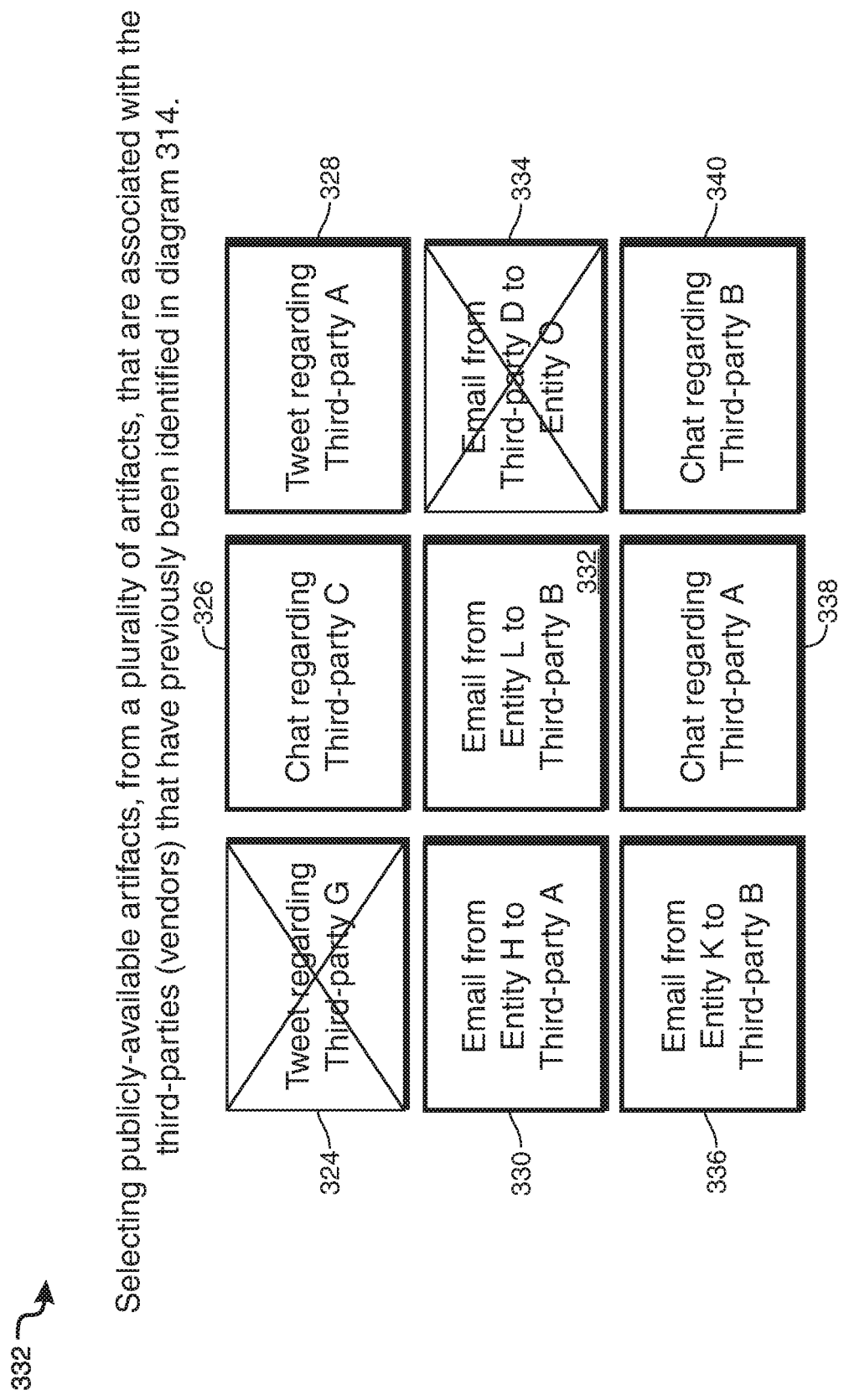

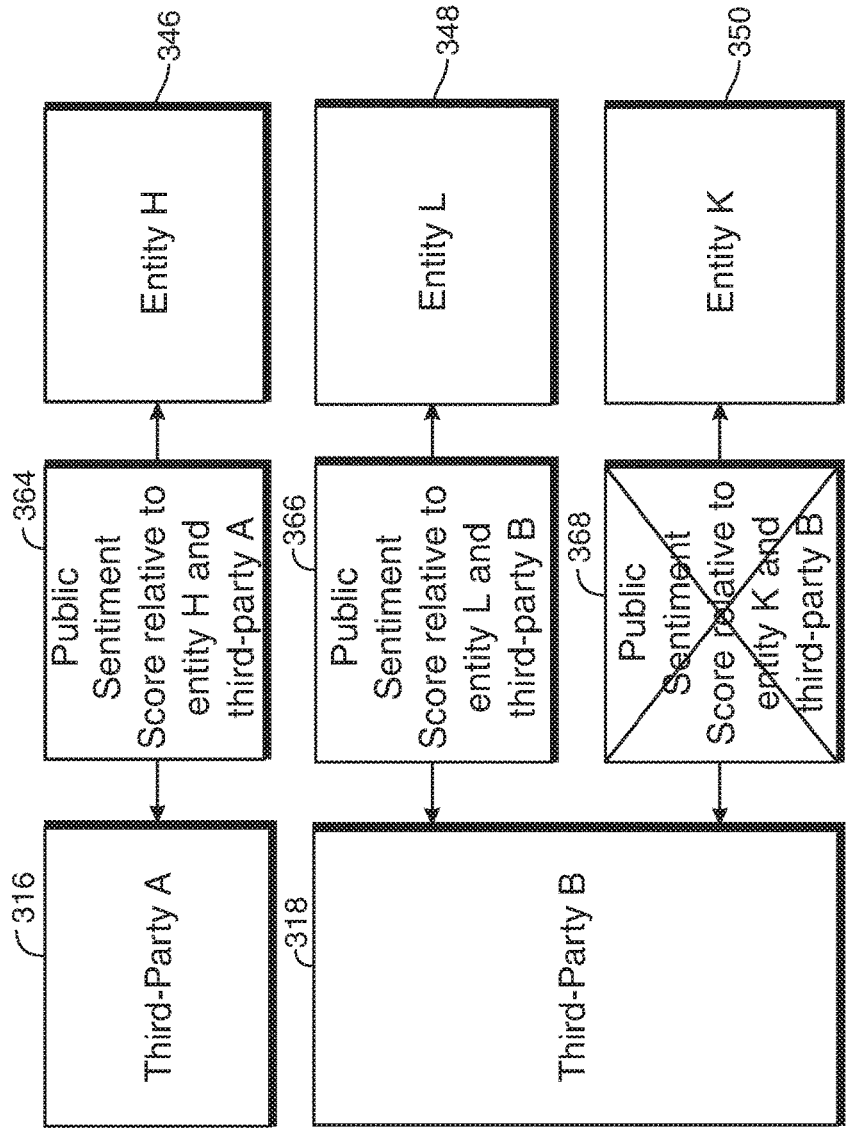

| | |
|---|---|
| SENTIMENT ANALYSIS REPORT OF PUBLICLY AVAILABLE ARTIFACTS BETWEEN ENTITY K AND THIRD-PARTY B — 504 | |
| Letter — 506 | Total Count: 52, 25 scored between 66-100%, 15 scored between 33-66% and 12 scored between 0-33%. — 518 |
| IMS — 508 | Total Count: 87, 35 scored between 66-100%, 20 scored between 33-66% and 32 scored between 0-33%. — 520 |
| Chat — 510 | Total Count: 560, 203 scored between 66-100%, 107 scored between 33-66% and 250 scored between 0-33%. — 522 |
| Email — 512 | Total Count: 957, 410 scored between 66-100%, 447 scored between 33-66% and 100 scored between 0-33%. — 524 |
| SMS — 514 | Total Count: 1234, 865 scored between 66-100%, 229 scored between 33-66% and 140 scored between 0-33%. — 526 |
| Phone Call — 516 | Total Count: 45, 15 scored between 66-100%, 20 scored between 33-66% and 10 scored between 0-33%. — 528 |

TUNABLE SYSTEM FOR MONITORING THREATS TO THIRD-PARTIES

FIELD OF TECHNOLOGY

This disclosure relates to tunable monitoring and alerting systems.

BACKGROUND OF THE DISCLOSURE

Since the advent of the digital world, the internet has provided and continues to provide a source of opinionated information. This information may be culled from a variety of internet channels in which an entity may voice an opinion. Such internet channels may include blogs, emails, social media, chats, text messaging, message services or any other suitable opinion-voicing channel. Because of the ease associated with providing opinions, testimonials and comments on the internet, there has been a proliferation of written opinions available regarding a wide variety of topics.

Opinionated information is used by various industries for a variety of purposes. Opinions may be used to understand the public's attitude towards a product, company or relationship. Public discourse in online sources, such as social media, may be correlated with the occurrence of real-world behavior.

It would be desirable to analyze the sentiment included in publicly-available opinion data. It would be further desirable to analyze such data as it relates to third-parties vis-à-vis entities. It would be still further desirable to analyze such third-party data as it relates to entities that share characteristics of a predetermined entity. Such sentiment analysis may enable the specific entity to identify and monitor threats to or from the third-parties. Threats to the third-parties may be used to identify indirect threats to which the specific entity may become vulnerable during and after a relationship between the entity and the third-party.

SUMMARY OF THE DISCLOSURE

A method for tunable monitoring of threats to third-parties and risks to third-parties is provided. It should be appreciated that, in the context of this application, threats may be understood to refer to computer security risks and threats. Examples of computer security risks and threats may include viruses, computer malware and computer spyware. It should also be appreciated that, in the context of this application, third-parties may include vendors, consultants, employees and other suitable third-parties.

The method may include receiving a request from an entity to enable a third-party to satisfy an entity condition. The method may include initiating contact between the entity and a third-party. It should be appreciated that an entity system or entity module may execute the method steps. The method may include determining a scope of a potential relationship between the entity and the third-party.

The method may include determining a plurality of relationship characteristics relating to the potential relationship. The method may include mining publicly-available data to determine public sentiment relating to the relationship characteristics. Publicly-available data may include artifacts. The artifacts may include publicly-available artifacts, such as emails, tweets, chats and blog entries. The artifacts may also include non-confidential third-party provided artifacts. The artifacts may also include any other suitable artifacts.

The method may include identifying public sentiment relating to the publicly-available data. Public sentiment may be understood to refer to all sentiment derived from artifacts. The method may include scoring the public sentiment relating to the publicly-available data. The scoring the public sentiment may generate sentiment scores.

The method may include displaying the sentiment scores and/or the scoring relating to the public sentiment. A dashboard may display the scoring.

The method may include identifying that a score is below a predetermined threshold of negativity. The score may be included in, or generated by, the scoring. The method may include initiating the relationship in response to identifying that the score is below the predetermined threshold of negativity.

The method may include identifying that a score is above a predetermined threshold of negativity. The score may be included in, or generated by, the scoring. The method may include dissolving the relationship in response to identifying that the score is above the predetermined threshold of negativity.

The method may also include mining publicly-available data for public sentiment relating to characteristics of the third-party. The method may include identifying public sentiment relating to the characteristics of the third-party. The method may include scoring the public sentiment relating to the characteristics of the third-party. The method may include displaying the scoring of the public sentiment relating to the characteristics of the third-party on the dashboard.

The method may include generating a combined score. The combined score may merge the scoring of the public sentiment relating to the relationship characteristics and the scoring of the public sentiment relating to the characteristics of the third-party. The method may include displaying the combined score on the dashboard.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 3A-3I show illustrative diagrams in accordance with principles of the disclosure;

FIG. 5 shows another illustrative diagram in accordance with principles of the disclosure;

DETAILED DESCRIPTION OF THE DISCLOSURE

Figure 1:
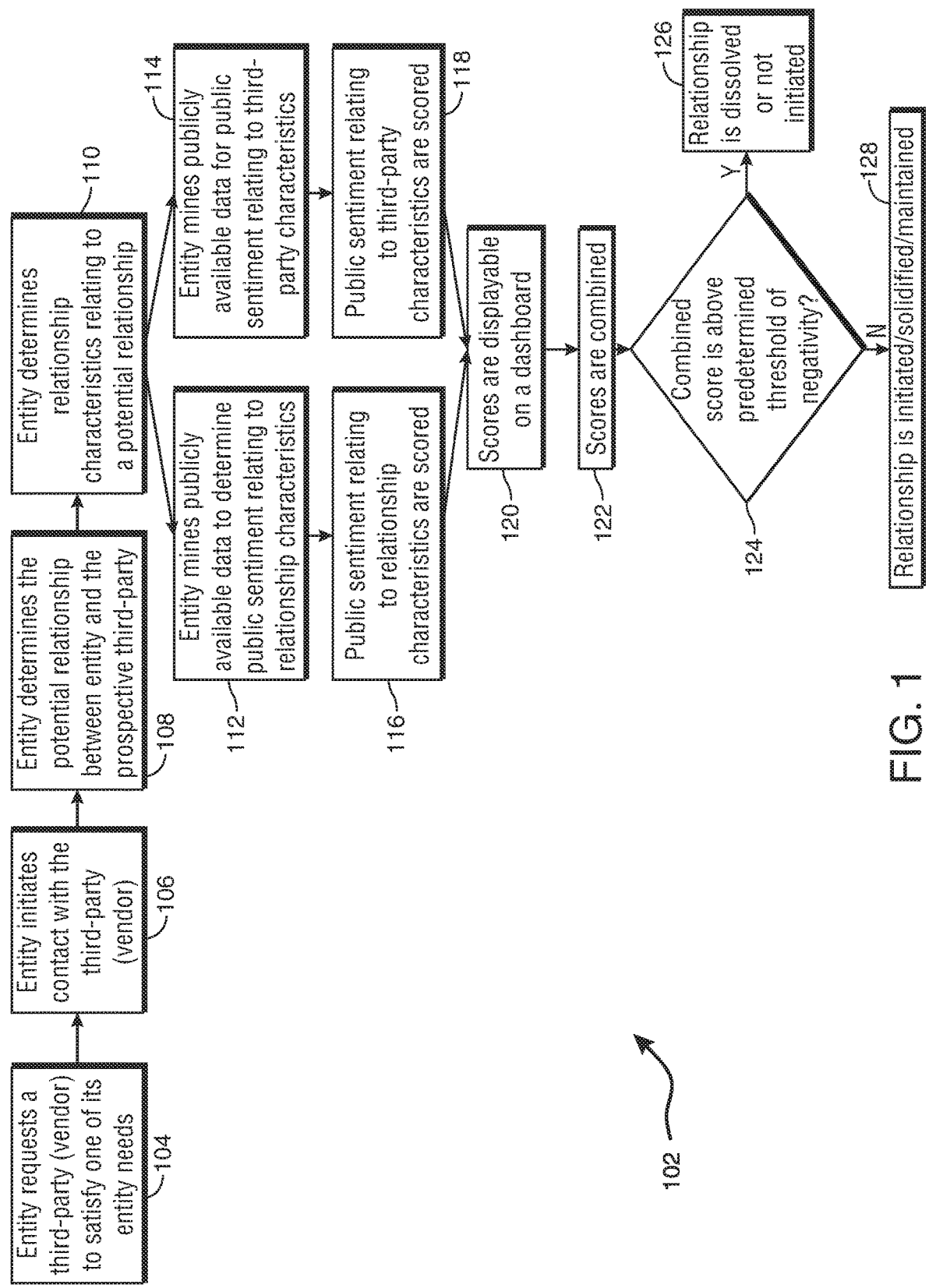
FIG. 1 shows an illustrative flow chart in accordance with principles of the disclosure.

A system for providing tunable monitoring of computer security threats to third-parties is provided. The method may include receiving a plurality of third-party characteristics. The plurality of third-party characteristics may include third-party size, third-party location and/or plurality of locations, third-party field of operation and any other suitable characteristics.

The method may include receiving a plurality of relationship characteristics. The relationship characteristics may relate to a perspective relationship between an entity and the third-party.

The method may include tuning a model for identifying computer security risks to the entity. The computer security risks may be risks associated with the third-party. The tuning may be based on the plurality of third-party characteristics and based on the plurality of relationship characteristics.

The method may include receiving a plurality of artifacts. The artifacts may be related to the third-party. The method may include determining a sentiment score for each artifact. The sentiment score determination may be based on the model tuned for the third-party. The sentiment score determination may also be based on plurality of processes. Such processes may include natural language processing, computational linguistics, biometrics and text analysis.

Natural language processing may involve computer-based, human-like communication and interaction with computers. Natural language processing enables computers to decipher human conversation and text written in regularly-used languages, such as English, Spanish, French, etc. Computational linguistics may involve computer-implemented methodologies directed to analyzing and deciphering expressions and vocabularies.

Biometrics may involve utilizing identifying human characteristics to determine information regarding an artifact. Such human characteristics may include tone of voice or other suitable non-identifying human characteristics.

Text analysis may include analyzing key words and phrases within the artifact. Analyzing key words and/or phrases may draw upon definitions located in a key word and phrase sentiment library. A key word and phrase sentiment library may include a plurality of key words and phrases, and one or more sentiments, or sentiment scores, associated with each key word and/or phrase.

Text analysis may include analyzing emoticons and/or emojis within the artifact. Analyzing emoticons and/or emojis may draw upon definitions located in an emoticon and/or emoji library or list. An emoticon and/or emoji library or list may include a plurality of emoticons and/or emojis, and one or more sentiments, or sentiment scores, associated with each emoji or emoticon.

Text analysis may include analyzing characters within the artifact. Characters may include (American Standard Code for Information Interchange) ("ASCII") characters, non-ASCII characters or any other suitable character set.

Text analysis may include analyzing the length of an artifact, and the length of a response to the artifact. For example, a relatively short artifact, or short response, may indicate an abrupt artifact; a relatively long artifact, or long response, may indicate a clearly illustrated artifact.

Text analysis may include analyzing response time between the transmission of multiple artifacts. For example, receiving a response shortly after the transmission may indicate urgency; receiving a response a substantial time after transmission may indicate insignificance.

Text analysis may include analyzing related artifacts. Related artifacts may fill in details ostensibly missing from an artifact. For example, a short artifact may typically indicate an abrupt response. However, a short artifact transmitted in response to an invitation may be considered an artifact with positive sentiment.

Text analysis may include analyzing negation. Negation may involve an indication that the spoken or written word should be understood in a manner opposite its accepted definition. Examples of negation may include writing "#NOT" after a comment.

Text analysis may include analyzing exaggerations. Text analysis may also include analyzing jokes. Text analysis may also include analyzing sarcasm. The text analysis may combine various components to determine the sentiment of an artifact.

The method may include adding the sentiment score, determined for the artifact, to an aggregated sentiment score. The method may include generating an aggregated sentiment score for the plurality of artifacts relating to the third-party.

An aggregated sentiment score that is determined to be above a predetermined threshold, may indicate negativity or unease between the third-party and other entities. The method may include identifying communications that include an aggregated sentiment score above a predetermined threshold.

Lower levels of negativity or unease, or aggregated sentiment scores above the predetermined threshold and below a second predetermined threshold, may indicate strained communications between the third-party and other entities. Higher levels of negativity or unease, or aggregated sentiment scores above the second predetermined threshold, may indicate real or perceived threats or risks to the third-party.

When the aggregated sentiment score is above a predetermined threshold, the prospective relationship between the entity and the third-party may be solidified into a permanent relationship. When the aggregated sentiment score is below a predetermined threshold, the prospective relationship between the entity and the third-party may be dissolved.

Sentiment scores above a predetermined threshold level of negativity may indicate that a third-party is at greater than a predetermined threshold level of risk to be the target of a physical attack or cyber-attack. In the event that the third-party is the victim of a physical attack or cyber-attack, entities that have a relationship with the third-party may be damaged. For example, if a third-party incurs a data breach, an entity's data, hosted on the third-party's servers, may be compromised. Therefore, an entity may determine that relationships with a third-party that are at high risk of an attack may be high-risk relationships. As such, entities may withdraw, or retreat, from relationships with high-risk third-parties. Hence, when the determined sentiment score for a specific third-party is above the predetermined threshold level of negativity, a potential relationship between an entity and the third-party may be dissolved.

The model may include retrieving artifacts. The artifacts may involve public sentiment relating the third-party vis-à-vis one or more entities that share one or more entity characteristics with the entity.

The tuning the model may include retrieving artifacts that involve public sentiment regarding the third-party vis-à-vis one or more entities that share one or more entity characteristics with the entity.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow chart. Illustrative flow chart 102 shows a process for determining sentiment between a third-party and a plurality of entities that share entity characteristics with a predetermined entity.

Flow chart 102 shows an entity requests a third-party, such as a vendor, as shown at 104. The entity may request the third-party in order to satisfy an entity need. An entity need may also be referred to herein as an entity condition. The entity may initiate contact with the third-party, as shown at 106.

The entity may determine a potential relationship between the entity and the prospective third-party, as shown at 108. The entity may also determine relationship characteristics relating to the potential relationship, as shown at 110. Examples of potential relationship characteristics may include relationship cost, relationship field of operation, relationship length and relationship intensity—i.e., how often are communications proposed to be transmitted between the entity and the third-party.

The entity may mine publicly-available data to determine public sentiment relating to the relationship characteristics, as shown 112. The publicly-available data may include artifacts such as chats, letters, emails and blogs. The public sentiment relating to the relationship characteristics may be scored, as shown at 116. A scoring scale, such as those shown in FIGS. 5-7 may be used to score the public sentiment.

The entity may also mine publicly-available data to determine public sentiment relating to third-party characteristics, as shown at 114. It should be appreciated that the third-party characteristics may produce different outcomes from the potential relationship characteristics. For example, both the third-party characteristics and the potential relationship characteristics may include location data. The majority of publicly-available data relating to the third-party location characteristic may express that the third-party is in a desirable location. However, the publicly-available data relating to the third-party location vis-à-vis the potential relationship between the entity and the third-party may express that the distance between the third-party and the entity is lengthy and, therefore, presents an undesirable attribute. The public sentiment relating to third-party characteristics may be scored, as shown at 118.

The scores of the public sentiment relating to relationship characteristics and the scores of the public sentiment relating to third-party characteristics may be displayed on a dashboard, as shown at 120. The scores of the public sentiment relating to relationship characteristics and the scores of the public sentiment relating to third-party characteristics may be combined, as shown at 122. It should be appreciated that, at times, the scores may be combined prior to being displayed on the dashboard.

A determination may be made as to whether the combined score is above a predetermined threshold of negativity, as shown at 124. When the combined score is above the predetermined threshold of negativity, the relationship between the entity and the third-party may be dissolved or not initiated, as shown at 126. When the combined score is below the predetermined threshold of negativity, the relationship between the entity and the third-party may be initiated, solidified or maintained, as shown at 128.

As described above with regard to element 106, the entity may initiate contact with a plurality of third-parties. The entity may research the sentiment of each the third-parties included in the plurality of third-parties, as described above with regard to elements 104-122. The entity may select one third-party from the plurality of third-parties. The selection may be based in whole or in part on the determined sentiment score.

Figure 2:
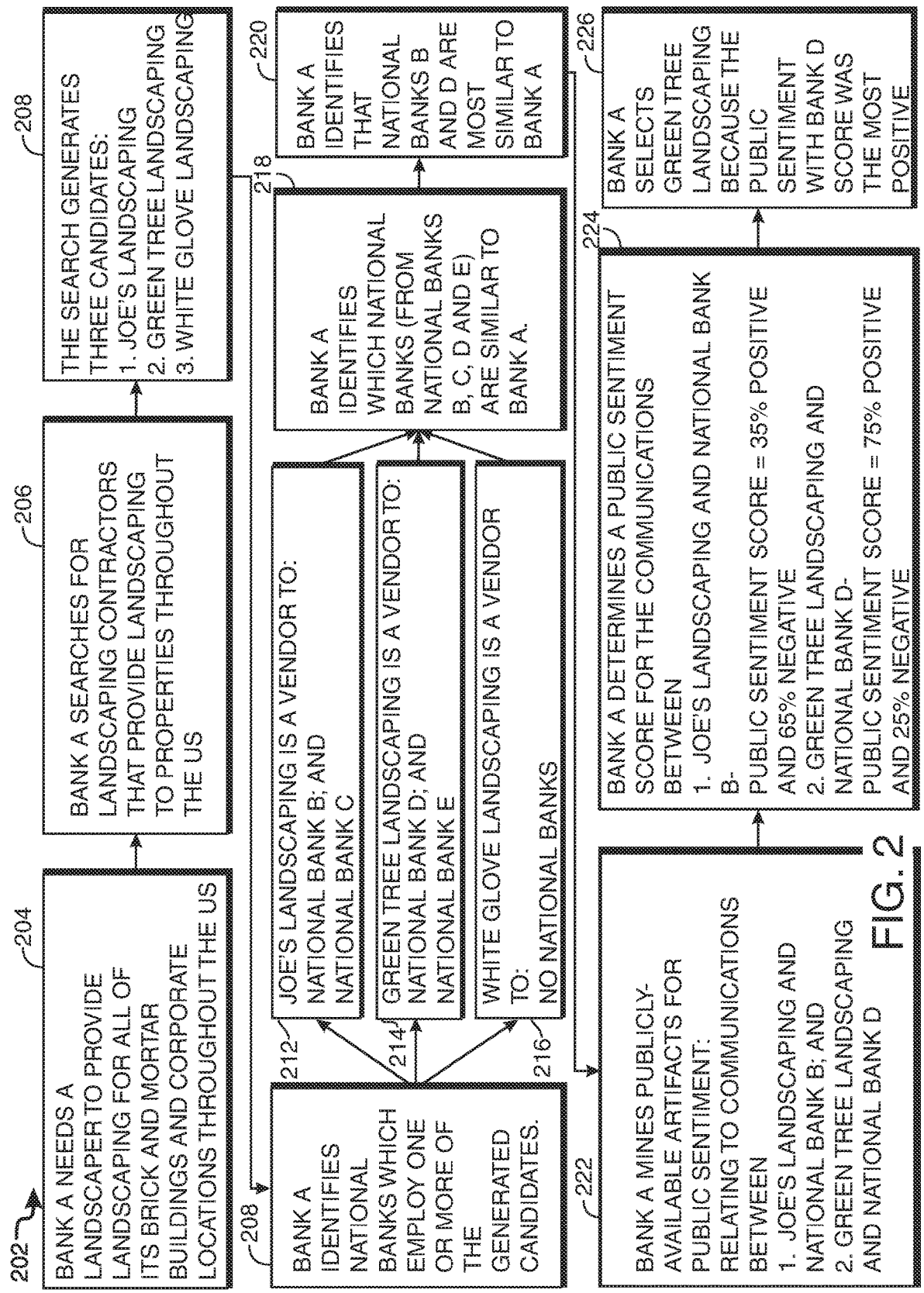
FIG. 2 shows another illustrative flow chart in accordance with principles of the disclosure.

FIG. 2 shows illustrative flow diagram 202. Illustrative flow diagram 202 shows an exemplary process flow illustrating the selection of a vendor using embodiments of the disclosure.

Element 204 shows that bank A needs a landscaper to provide landscaping for all its brick and mortar building and corporate locations throughout the United States. Bank A may perform a search to identify landscaping contractors that provide landscaping to properties throughout the United States, as shown at 206.

The search may generate results. As shown at element 208, the results generated by the search may include three candidates: Joe's Landscaping, Green Tree Landscaping and White Glove Landscaping, as shown at 208. (It should be noted that these names are fictional.)

Bank A may identify national banks which employ one or more of the generated candidates, as shown at 210. Element 212 shows that Joe's Landscaping is a vendor to national bank B and national bank C. Element 214 shows that Green Tree landscaping is a vendor to national bank D and national bank E. Element 216 shows that White Glove Landscaping is a vendor to no national banks.

Bank A may identify which national banks (from national banks B, C, D and E) are similar to bank A, as shown at element 218. The similarity identification may be based on corporate characteristics that are shared between bank A and national bank B, C, D or E. Bank A may identify that national banks B and D are most similar to bank A, as shown at element 220.

As shown at element 222, Bank A may mine publicly-available artifacts, such as public emails, tweets, chats and blog entries, to determine public sentiment relating to communications between Joe's Landscaping and national bank B. Bank A may also mine publicly-available artifacts to determine public sentiment relating to communications between Green Tree Landscaping and national bank D.

Vendors vying for contracts may also consent to provide, and provide, private artifacts as well.

Bank A may determine a public sentiment score for the communications between Joe's Landscaping and national bank B. The public sentiment score may be 35% positive and 65% negative, as shown at element 224. Bank A may also determine a public sentiment score for the communications between Green Tree Landscaping and national bank D. The public sentiment score may be 75% positive and 25% negative, as shown at element 224.

Element 226 shows that bank A may select Green Tree Landscaping because the public sentiment between Green Tree Landscaping and Bank D was the most positive from all of the determined public sentiment scores.

It should be appreciated that, in some embodiments, the public sentiment score may be used as part of a vendor selection model. The vendor selection model may consider a plurality of scores when selecting a vendor. The plurality of scores may include a price score, a public sentiment score, a geographic location score and any other suitable score.

FIGS. 3A-3I show illustrative diagrams.

Figure 3A:
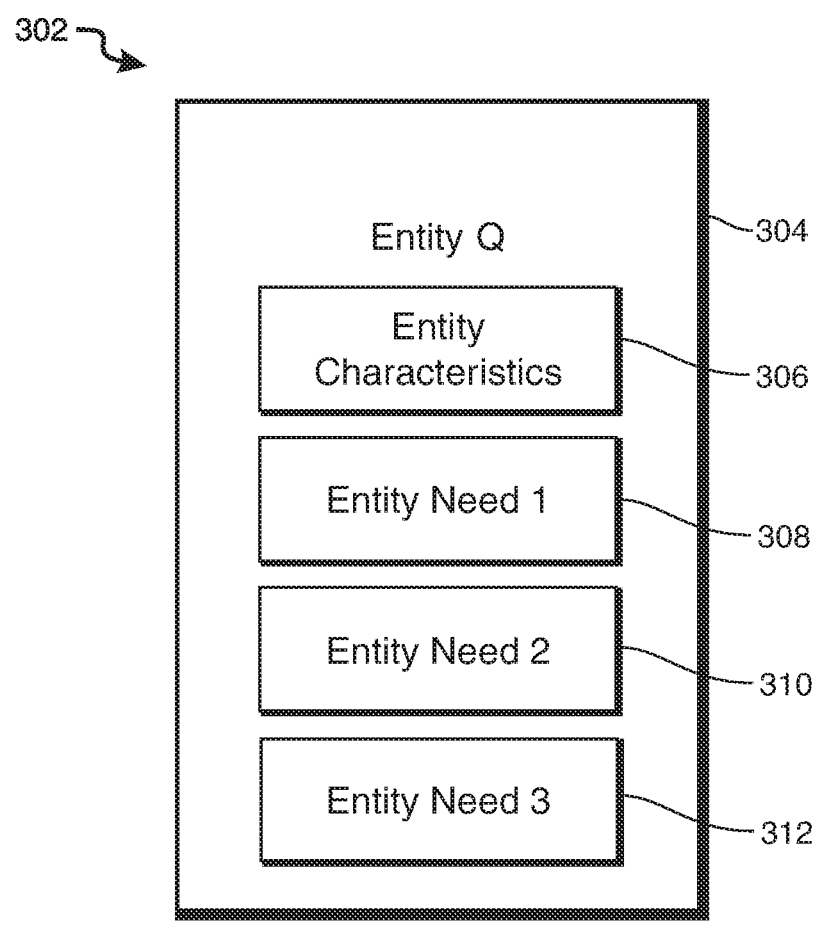

FIG. 3A shows illustrative diagram 302. Illustrative diagram 302 includes Entity Q, shown at 304. Entity Q may be a business, non-profit organization, corporation or other suitable entity. Entity Q may be Bank A, which was described in FIG. 2.

Entity Q may have entity characteristics, referred to herein, in the alternative, as corporate characteristics, shown at 306. An example of entity characteristics may be entity size. Entity size may include a number of employees, a number of acres of physical property owned, a net value, or any other suitable entity size characteristics. Another example of an entity characteristic may be a financial health characteristic, such as a debt to income ratio. Another example of an entity characteristic may be entity location. The entity location may be one or more geographic location(s) or cyberspace location(s). Another example of an entity characteristic may be field(s) of operation. The field(s) of operation may include one or more areas in which the entity operates. Examples of fields of operation may include financial industry, health industry, education industry or food service industry.

Entity Q may also have entity needs, as shown at elements 308, 310 and 312. An example of entity needs may be landscaping needs of a certain predetermined scope and/or volume, as described in FIG. 2 in connection with bank A.

Figure 3B:
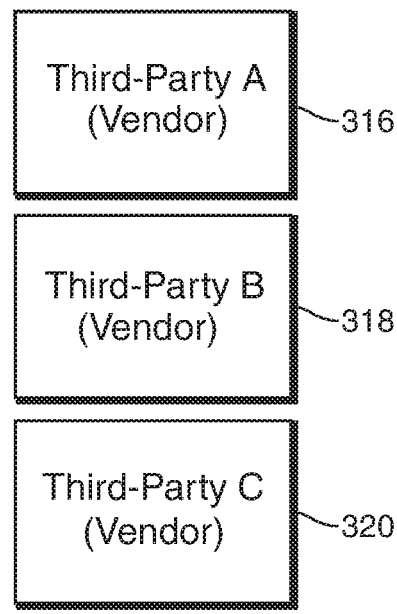

FIG. 3B shows illustrative diagram 314. Illustrative diagram 314 shows identifying available third-parties or vendors that may satisfy one or more of entity Q's needs. Such vendors may include third-party A, shown at 316, third-party B, shown at 318, and third-party C, shown at 320. An example of a third-party may be Joe's Landscaping, as described in FIG. 2.

FIG. 3C shows illustrative diagram 322. Illustrative diagram 322 shows selecting publicly-available artifacts, from a plurality of artifacts, that are associated with third-parties (vendors) that have previously been identified in step 314. The plurality of artifacts may include artifacts 324, 326, 328, 330, 332, 334, 336 338 and 340. Artifacts 326, 328, 330 332, 336, 338 and 340 may relate to third-parties A, B and C. Artifacts 324 and 334 may relate to third-partied G and D, respectively. Therefore, artifacts 324 and 334 may be discarded.

Figure 3D:
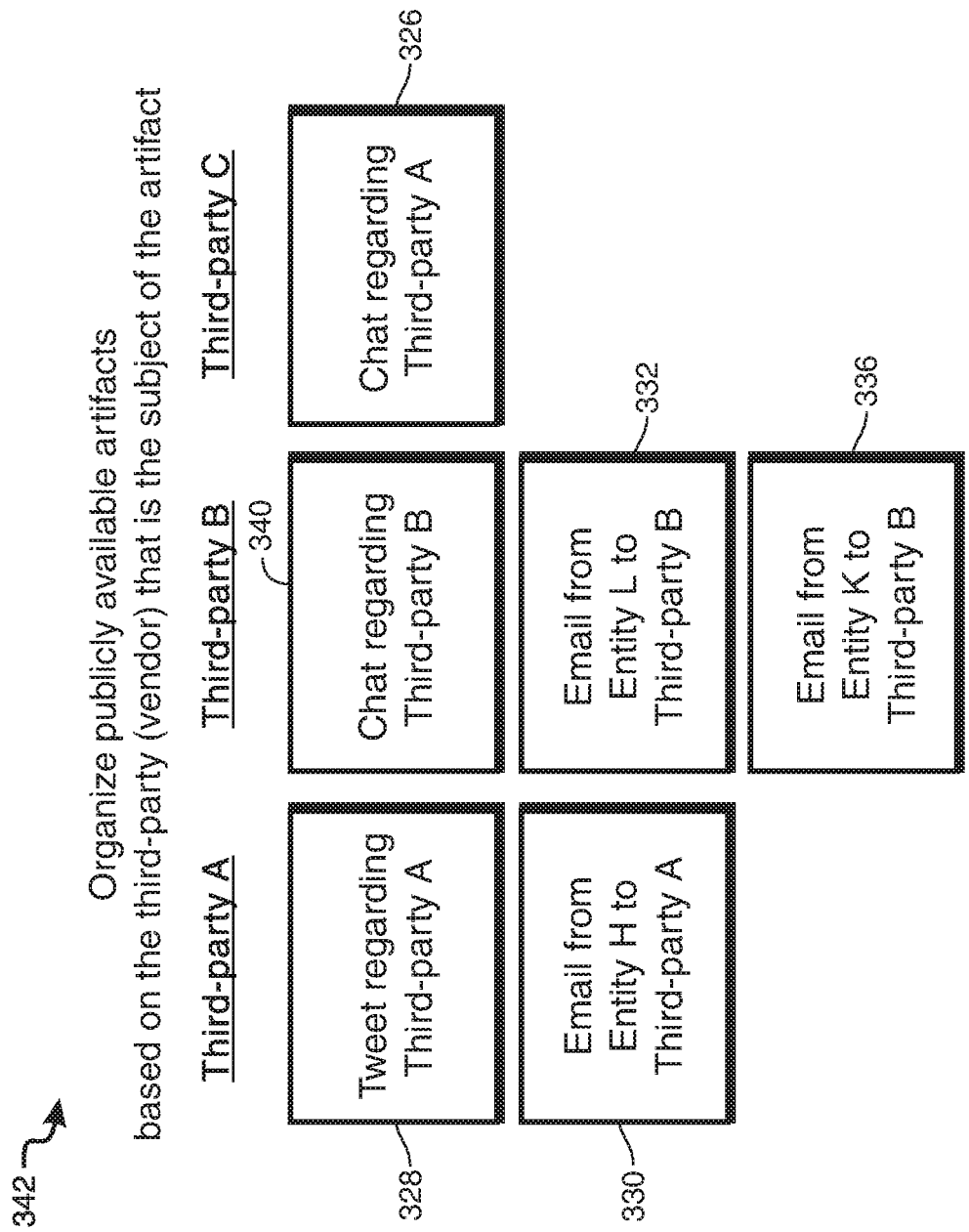

FIG. 3D shows illustrative diagram 342. Illustrative diagram 342 shows organizing the publicly-available artifacts, selected in diagram 322, based on the third-party that is the subject of the artifact. Artifacts 328, 330 and 336 relate to third-party A. Artifacts 340 and 332 relate to third-party B. Artifact 326 relates to third-party C.

Figure 3E:
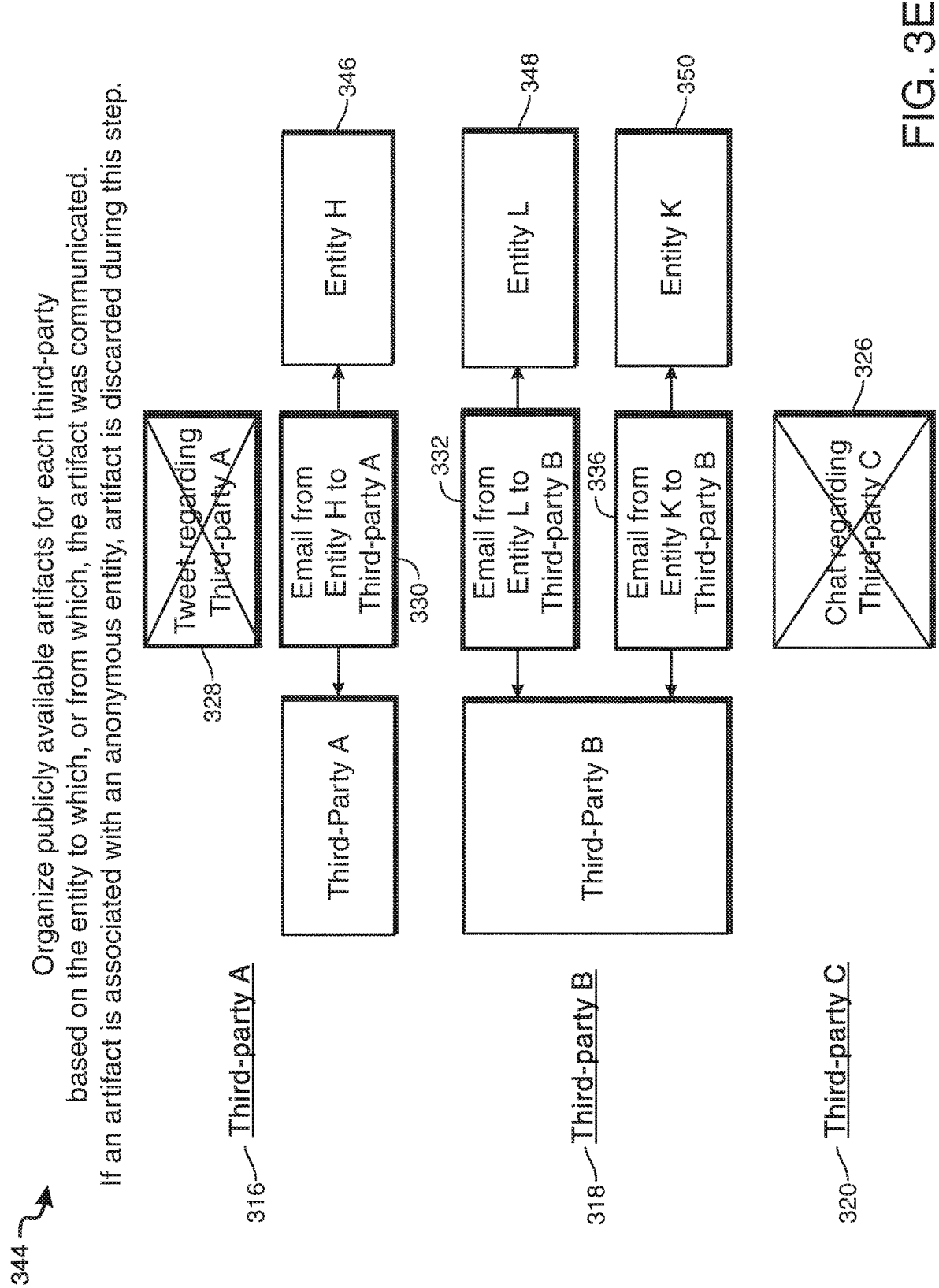

FIG. 3E shows illustrative diagram 344. Illustrative diagram 344 shows third-party A (316), third-party B (318) and third-party C (320). Illustrative diagram 344 also shows artifacts 328, 330, 332, 336 and 326. Illustrative diagram also shows entity H (346), entity L (348) and entity K (350).

Illustrative diagram 344 shows a more granular organizing of the artifacts that have been organized in step 342. In step 342, the artifacts are organized based on third-party. In step 344, the artifacts are organized, for each third-party, based on the entity to which, or from which, the artifact was communicated.

In an example, in step 342, artifacts 332 and 336 were shown grouped together as being associated with the same third-party. In step 344, artifact 332 is shown separate from artifact 336, because artifact 332 was communicated from Entity L (shown at 348) to third-party B, and artifact 336 was communicated from Entity K (shown at 350) to third-party B.

Illustrative diagram 344 also shows discarding artifacts that are associated with anonymous entities. As such, artifacts 328 and 326 are discarded.

Figure 3F:
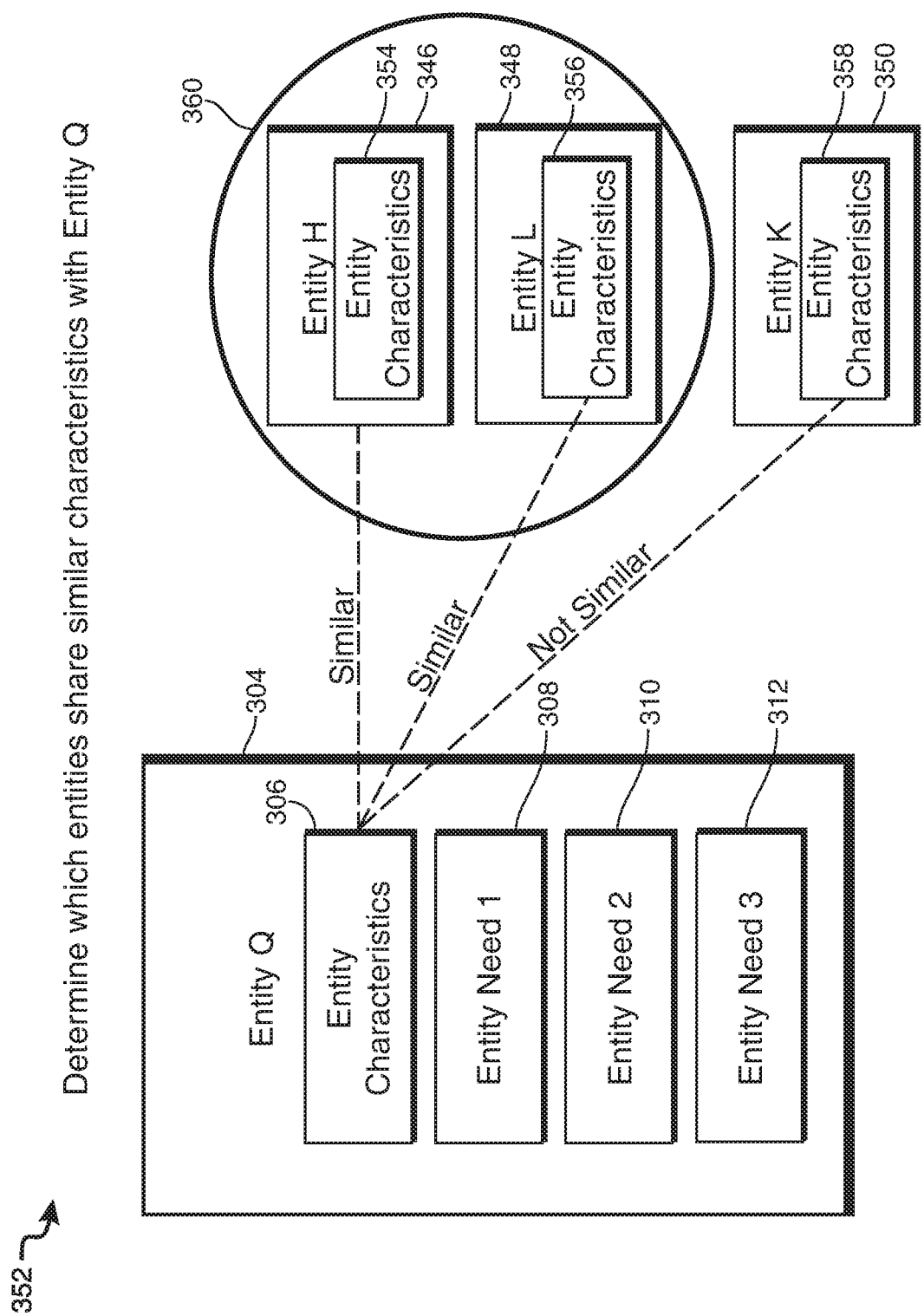

FIG. 3F shows illustrative diagram 352. Illustrative diagram 352 shows determining which entities, from the entities shown in diagram 344, share entity characteristics with entity Q.

Entity H, shown at 346, may include entity characteristics 354. Entity L, shown at 348, may include entity characteristics 356. Entity K, shown at 350, may include entity characteristics 358.

Entity Q's characteristics 306 may be similar to entity H's characteristics 354 and entity L's characteristics 356. However, entity Q's characteristics 306 may not be similar to entity K's characteristics 358. Therefore, entity H (346) and entity L (348) may be selected, as shown at 360.

FIG. 3G shows illustrative diagram 362. Illustrative diagram 362 shows that, for each entity that shares entity characteristics with entity Q—i.e., entities H and L, the publicly-available artifacts and/or data may be collapsed into a public sentiment score. The public sentiment score may be relative to the entity and the third-party. Public sentiment score 364 may show a score that indicates public sentiment relative to entity H and third-party A. Public sentiment score 366 may show a score that indicates public sentiment relative to entity L and third-party B.

Public sentiment scores relating to entities that do not share similar characteristics with entity Q may be discarded. As such, public sentiment score relative to entity K and third-party B may be discarded as shown at 368.

Figure 3H:
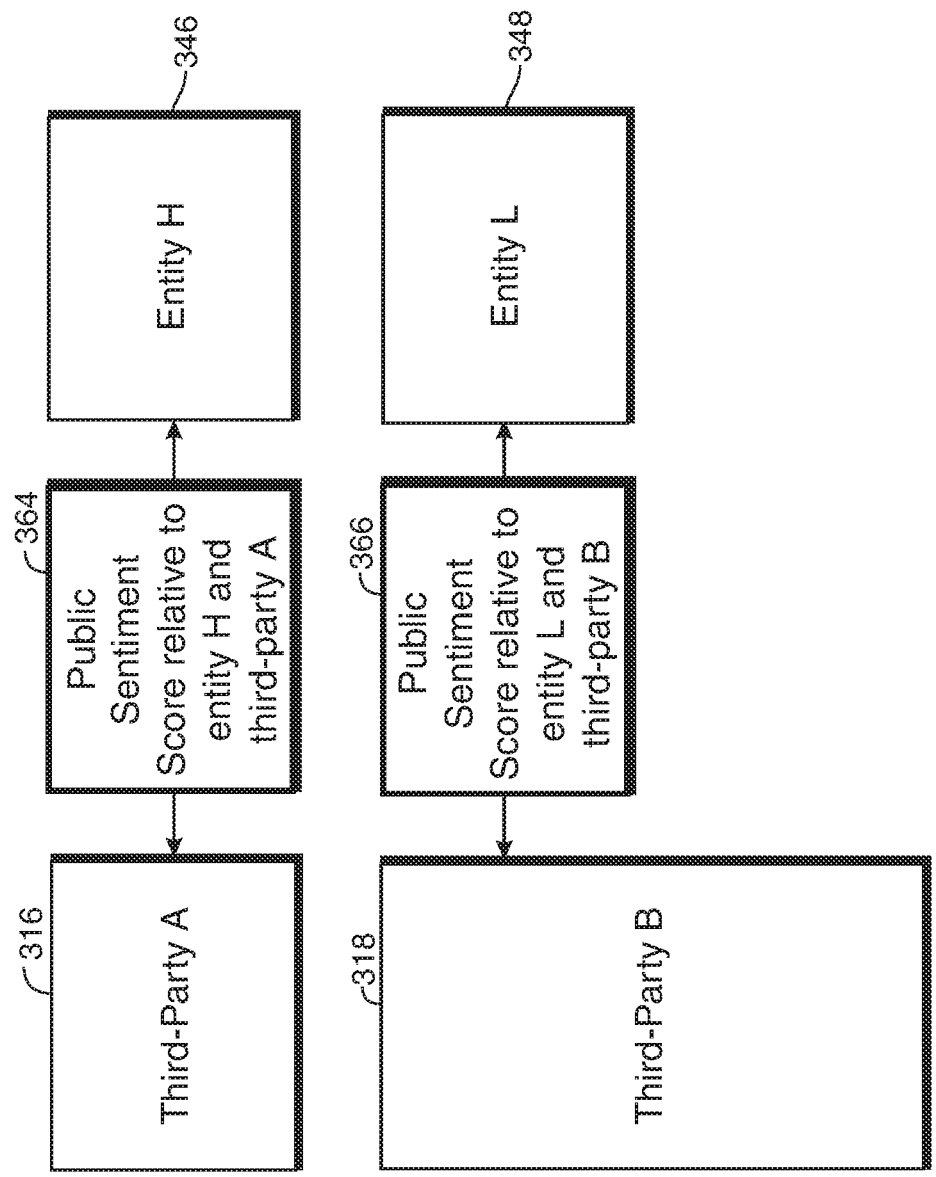
Figure 6:
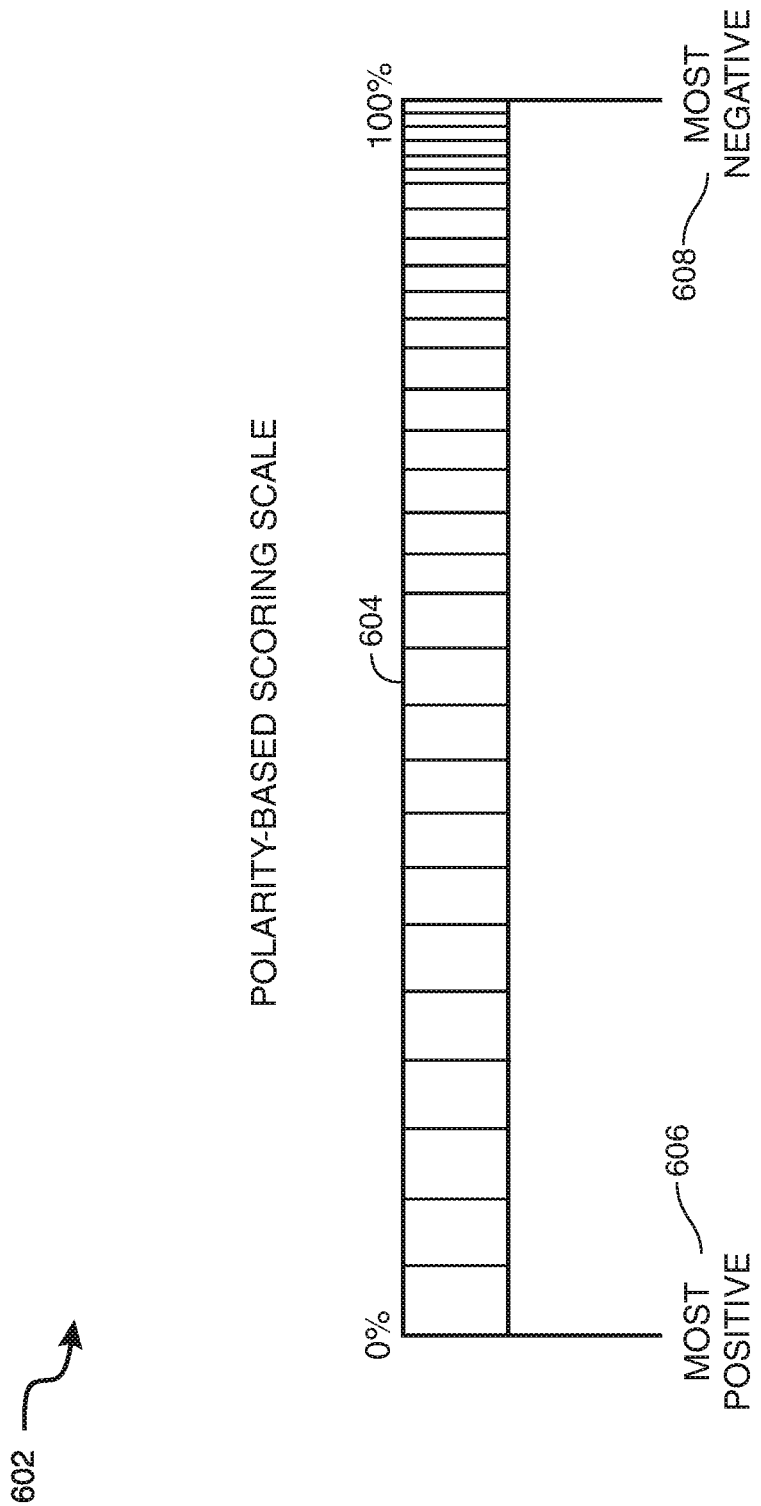
FIG. 6 shows still another illustrative diagram in accordance with principles of the disclosure.
Figure 7:
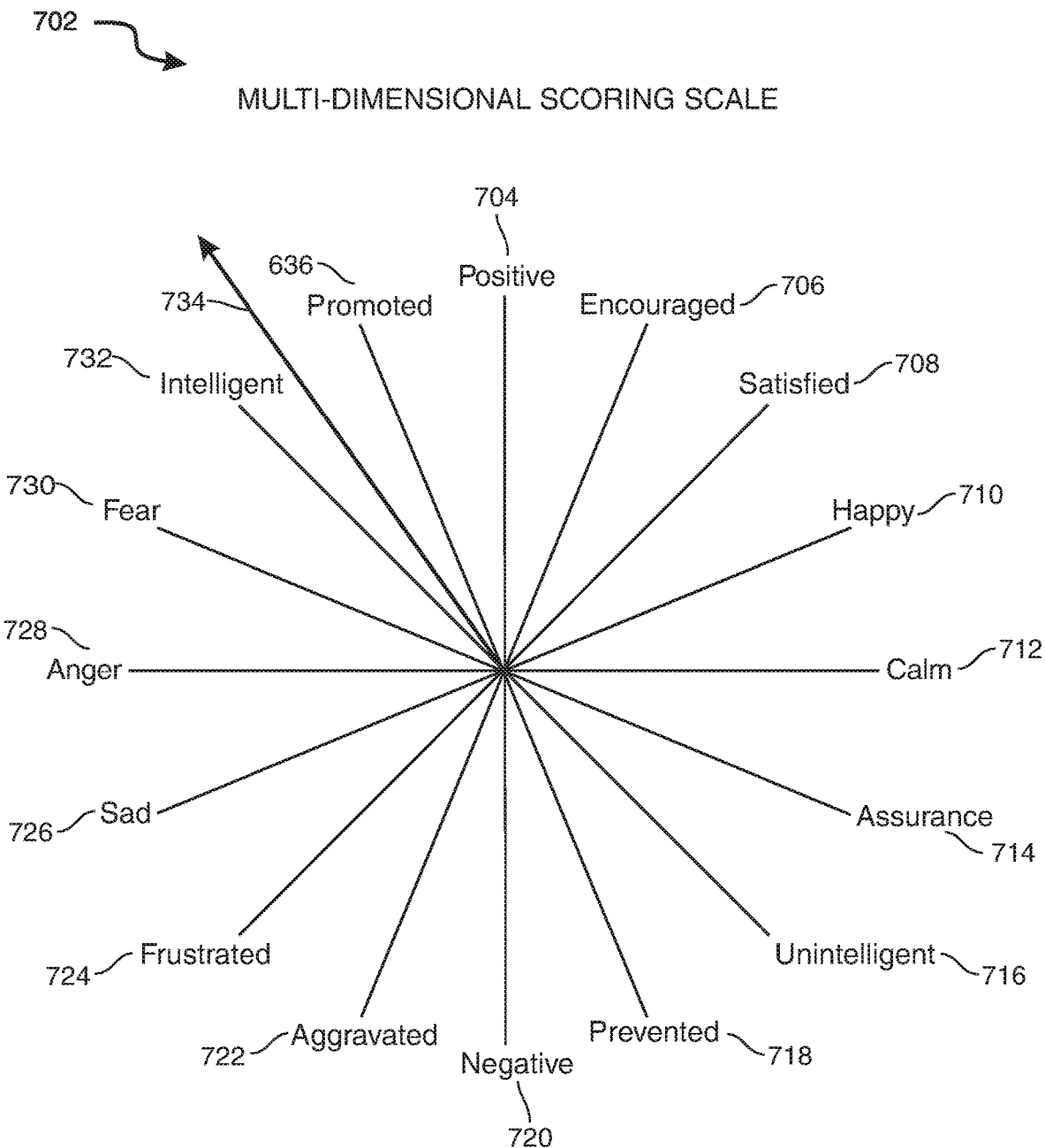
FIG. 7 shows yet another illustrative diagram in accordance with principles of the disclosure.
Figure 8:
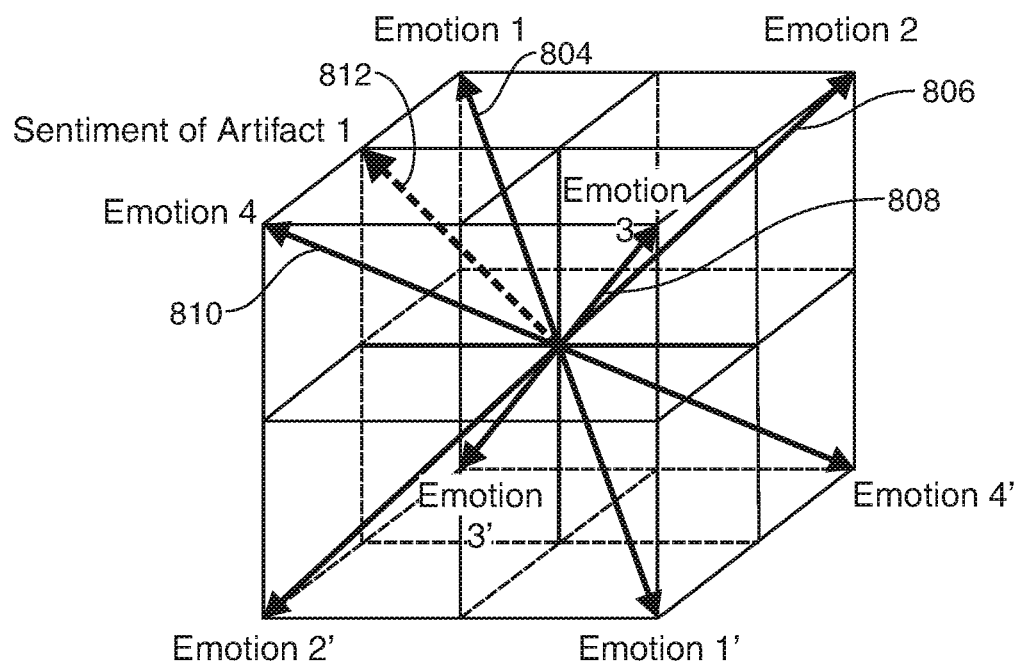
FIG. 8 shows still another illustrative diagram in accordance with principles of the disclosure.

FIG. 3H shows illustrative diagram 370. Illustrative diagram 370 may analyze public sentiment for entities that share entity Q's characteristics. Therefore, public sentiment 364 and public sentiment 366 may be analyzed. The analysis of public sentiment 364 and 366 may involve one or more algorithms for determining a public sentiment score. Examples of such algorithms are shown in FIGS. 6-8.

Figure 3I:
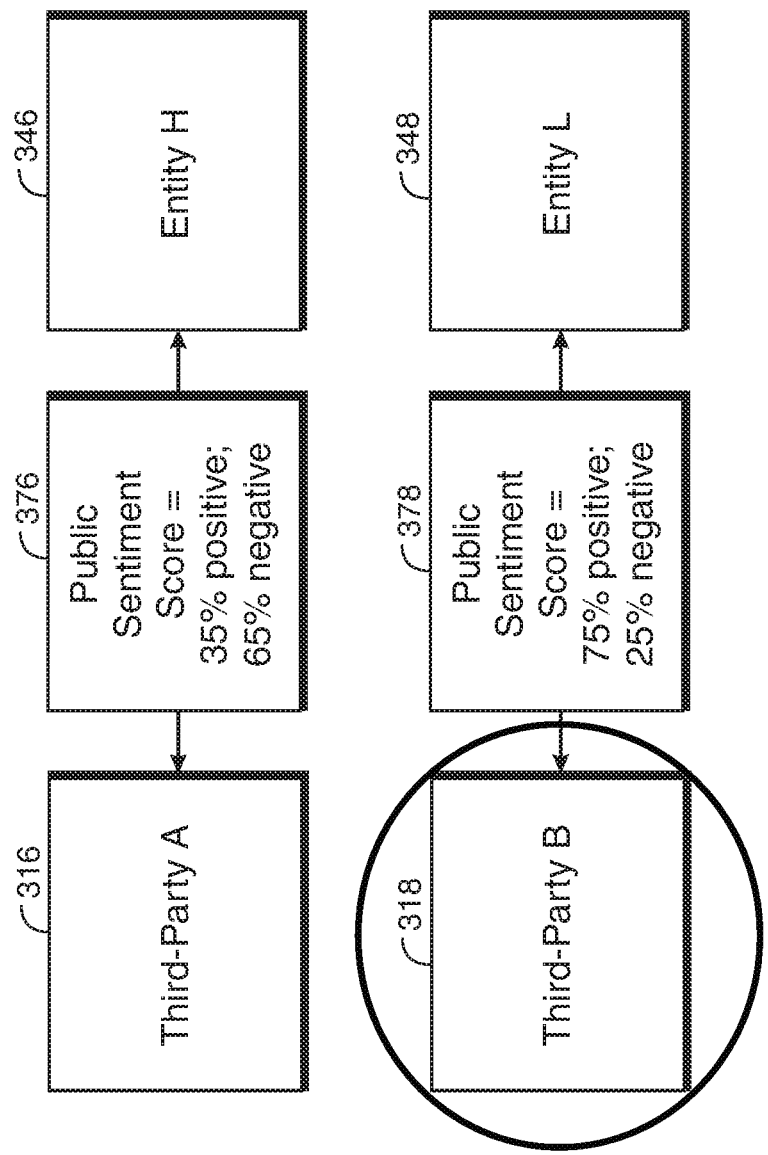

FIG. 3I shows illustrative diagram 372. Illustrative diagram 372 was a determination of a public sentiment score for the relationship between third-party A and Entity H. The public sentiment score for the relationship between third-party A and entity H may be 35% positive and 65% negative, as shown at 376. The public sentiment score for the relationship between third-party B and entity L may be 75% positive and 25% negative, as shown at 378.

Diagram 372 illustrates the selection of third-party B. The selection of third-party B may be based, in whole or in part, on large, or largest, percentage of positive public sentiment between third-party B and entity L.

Figure 4A:
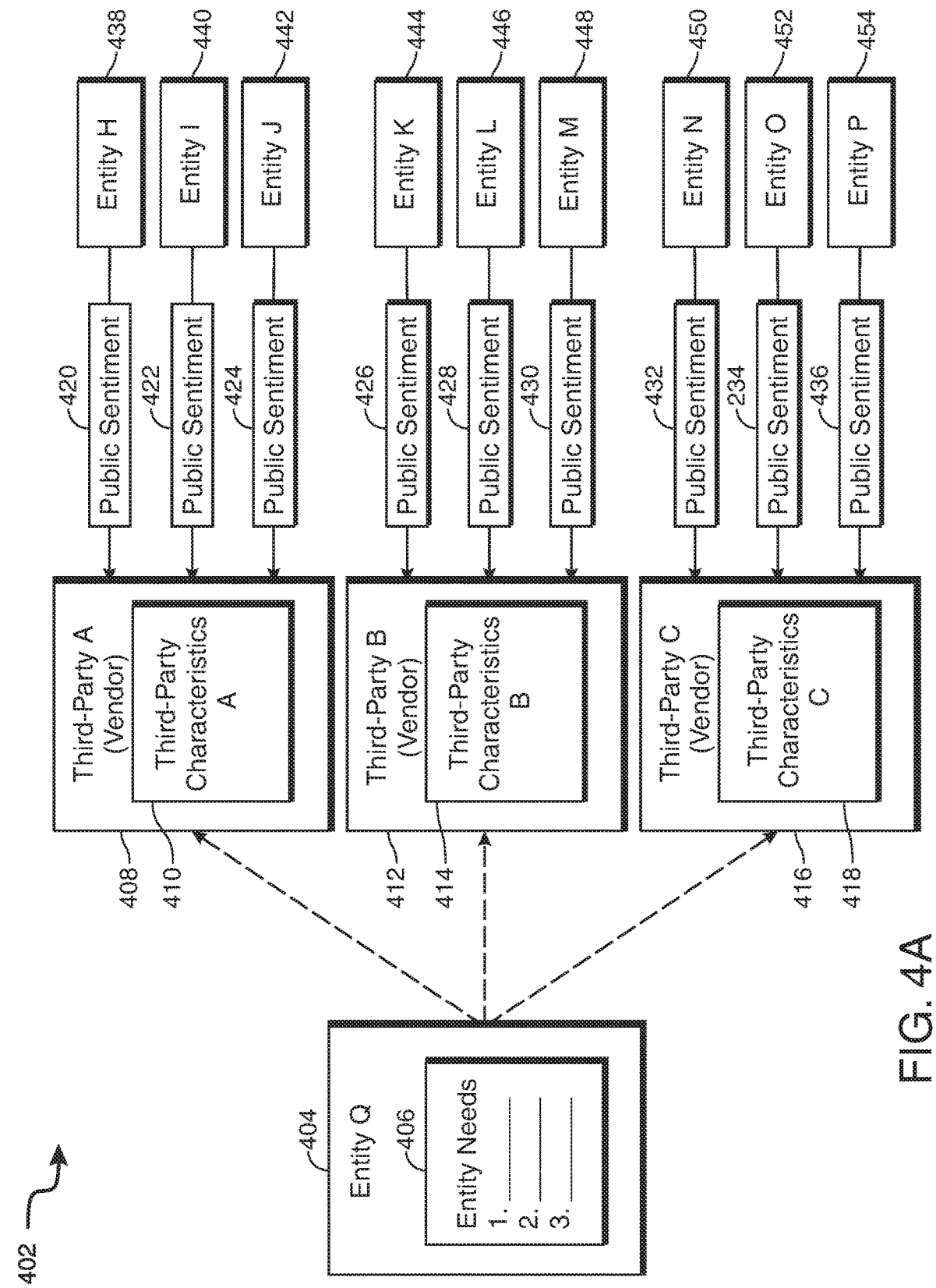
FIGS. 4A and 4B also show illustrative diagrams in accordance with principles of the disclosure.
Figure 4B:
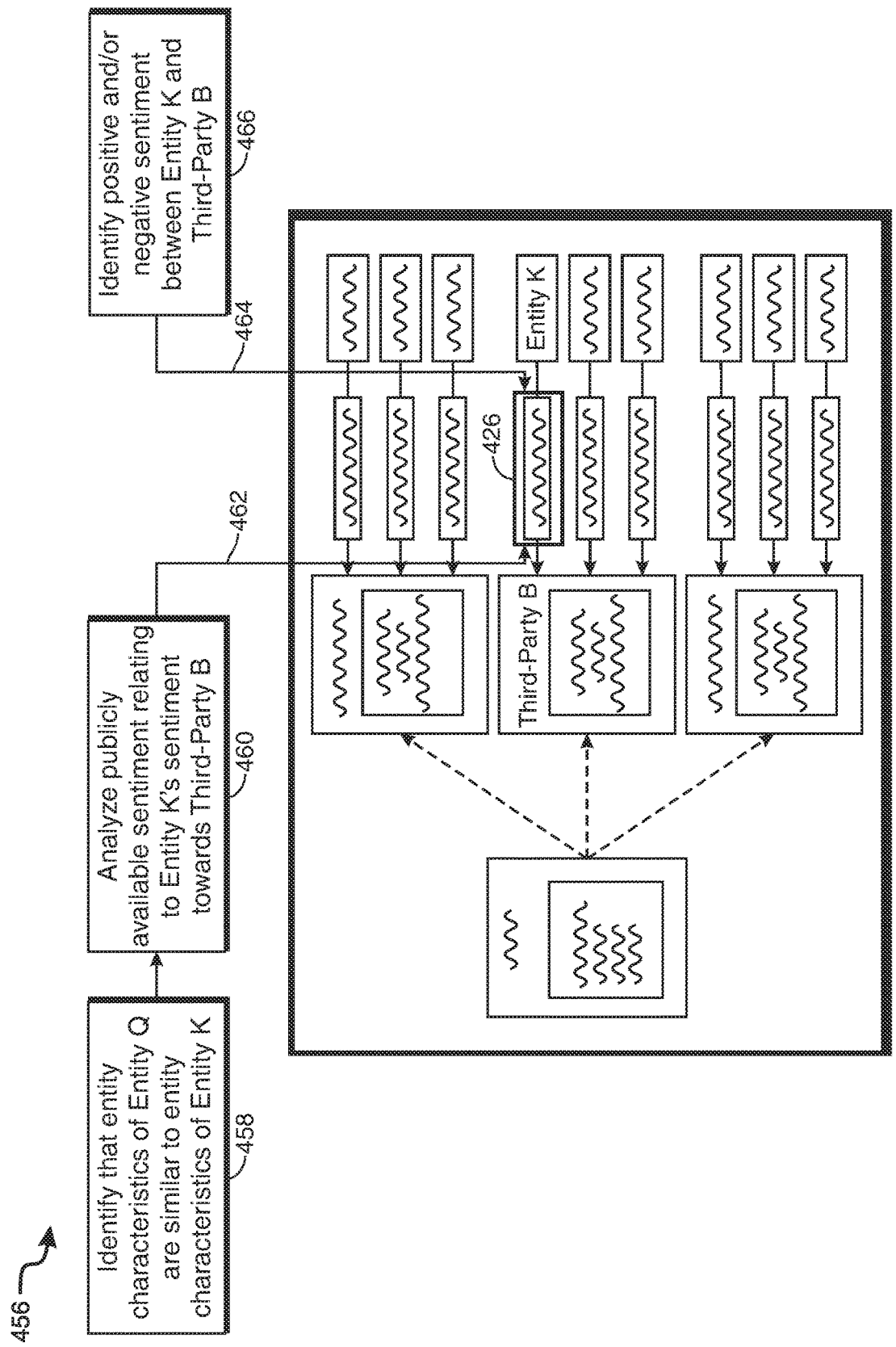

FIGS. 4A and 4B show illustrative flow chart 402. Illustrative flow chart 402 may show a first entity (entity Q) initiating contact with a plurality of third-parties. The plurality of third-parties may include third-party A, third-party B and third-party C, shown at 408, 412 and 416, respectively. The dotted lines between entity Q and third-parties A, B and C may be initiation lines.

It should be appreciated that the following process may be executed by entity Q. The following process may assist entity Q in selecting a third-party, from the plurality of third-parties, to satisfy one or more entity needs (shown at 406).

The process may retrieve publicly-available artifacts. The retrieved publicly-available artifacts may relate to the plurality of third-parties. Some of the publicly-available artifacts may include communications between an entity, included in a plurality of entities, and a third-party, included in the plurality of third-parties. The plurality of entities may include entity H (438), entity I (440), entity J (442), entity K (444), entity L (446), entity M (448), entity N (450), entity O (452) and entity P (454). It should be appreciated that entity Q may or may not be included in the plurality of entities. The plurality of third-parties may include third-party A, third-party B and third-party C.

A sentiment may be derived from each publicly-available artifact. The sentiment may describe the public's feeling towards one or more third-party or entity.

Entity Q, shown at 404, may include entity needs, shown at 406. Entity Q may initiate contact with third-parties A, B and C, shown at 408, 412 and 416, respectively.

Each of third-parties A, B and C may be able to provide one or more of entity Q's entity needs, shown at 406.

Each of third-parties A, B and C may include third-party characteristics, as shown at 410, 414 and 418, respectively. Third-party characteristics may include data relating to a third party. Such third-party characteristics may include third-party size data, third-party location data, third-party field of operation data and any other suitable data related to the third-party.

The process may determine all public sentiment that relates to each of third-parties A, B and C and a selection of entities, such as entities I, K and M.

The process may determine public sentiment that relates to each of third-parties A, B and C independent of other attributes. For example, the process may determine all public sentiment relating to each of third-parties A, B and C.

It should be appreciated that the inquiries and/or other determinations made by entity Q may be initiated by a public sentiment hardware-processor system. The hardware-processor system may be located at entity Q (204) or at any other suitable location.

The process may determine public sentiment relating to publicly-available communications between each of the third-parties and entities that share characteristics with entity Q. Such public sentiment, by inference, may assist in the public sentiment determination of each of the third-parties vis-à-vis entity Q. Therefore, the process may filter out publicly-available artifacts communicated to, or from, entities that do not share characteristics with entity Q. The process may maintain publicly-available artifacts that share characteristics with entity Q.

In one processing embodiment, the process may initially retrieve all artifacts comprising public sentiment relating to third-party A. The process may then determine the source of each artifact. The process may then divide the artifacts based on artifact source. The process may then determine a public sentiment score for each third-party vis-à-vis another predetermined entity. The following paragraphs illustrate this processing embodiment.

The process may determine public sentiment 420 based on artifacts that include communications between entity H, shown at 438, and third-party A. The process may also determine public sentiment 422 based on artifacts that include communications between entity I, shown at 440, and third-party A. The process may also determine public sentiment 424 based on artifacts that include communications between entity J, shown at 442, and third-party A.

The process may determine public sentiment 426 based on artifacts that include communications between entity K, shown at 444, and third-party B. The process may also determine public sentiment 428 based on artifacts that include communications between entity L, shown at 446, and third-party B. The process may also determine public sentiment 430 based on artifacts that include communications between entity M, shown at 448 and third-party B.

The process may determine public sentiment 432 based on artifacts that include communications between entity N, shown at 450 and third-party C. The process may also determine public sentiment 434 based on artifacts that include communications between entity O and third-party C. Entity Q may also determine public sentiment 436 based on artifacts that include communications between entity P, shown at 454 and third-party C.

In some embodiments, the process may pull these artifacts from third-party A, B and/or C. In certain embodiments, the process may pull these artifacts directly from publicly-available sources, such as application programming interfaces ("APIs").

After, before or simultaneous to, determining public sentiment scores 420-436, the process may determine a similarity score between entity Q and entities H-P. The similarity score may be based on characteristics of entity Q.

In some embodiments, the process may give more consideration to—i.e., weigh more heavily—the public sentiment of entities that share more than a predetermined number of characteristics with entity Q. The process may rank third-parties A, B and C based on the determined public sentiment and/or based on the entities that were associated with the artifacts that generated the public sentiment. The public sentiment retrieved from entities that share more than a predetermined number of characteristics with entity Q may be analyzed with a greater degree of attention. In some embodiments, the public sentiment may only be retrieved from entities that share more than a predetermined number of characteristics with entity Q.

The process may select a third-party to satisfy one of entity Q's needs based on one or more of the foregoing analyses.

FIG. 4B shows illustrative flow chart 456. Illustrative flow chart 456 shows identifying entity characteristics of entity Q that are similar to entity characteristics of entity K (shown at 444 in FIG. 4A), shown at 458. Element 460 shows analyzing publicly-available sentiment relating to entity's K sentiment towards third-party B.

Communication 462 shows retrieval of public sentiment 426 (shown in FIG. 4A). Communication 464, comprising public sentiment 426, is used to identify positive and/or negative sentiment between entity K and third-party B, shown at 466. The identified positive and/or negative sentiment may be used to dissolve and/or solidify a relationship between entity Q and third-party B.

FIG. 5 shows an exemplary sentiment analysis report 502. Sentiment analysis report 502 may display an analysis relating to the sentiment culled from publicly-available artifacts between entity K and third-party B, as shown at 504. In report 504, various categories of communications may be analyzed separately. The categories shown may include letters 506, IMS (Instant Messaging Service) 508, chat 510, email 512, SMS (Short Message Service) 514 and phone call 516. The analysis for each of the categories may be shown at 518 (letter analysis), 520 (IMS analysis), 522

(chat analysis), 524 (email analysis), 526 (SMS analysis) and 528 (phone call analysis). It should be appreciated that the analysis shown in FIG. 5 may be based on a polarity-based scoring model, such as the scale shown in FIG. 6, however, any suitable scoring model may be used to generate an analysis.

In some embodiments, different communication types may be weighted differently—i.e., not all communications may carry the same weight.

Such a sentiment analysis report may also be useful in determining which category of communication is most effective between the third-party and an entity. One communication mode may be determined to be more effective than another communication mode—i.e., a first communication mode is determined to include significantly more positive communications than a second communication mode.

A relationship may be instituted between an entity and third-party B. Such a relationship may utilize specific modes of communication that are deemed appropriate in order to optimize the relationship with third-party B.

FIG. 6 shows illustrative scoring scale 602. There may be various different methods or scales for scoring artifacts. For example, an artifact may be scored based on positive or negative sentiment. An artifact may be scored based on polar emotions, such as happy or sad. An artifact may be scored in a non-polar scale, such as a vector scaling model. An artifact may be scored based on a collection of multiple sentiment scoring methods or models.

Polarity-based scoring scale 604 is shown in FIG. 6. In such a scoring scale, each artifact is scored on a polar scale using linguistic scoring methodology. Linguistic scoring methodology may utilize various language scoring methods, such as natural language processing, computational linguistics and biometrics. The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, the text analysis may analyze key words and phrases, emoticons, characters, length of response, response time between artifacts, related artifacts, negation, exaggeration, jokes and sarcasm. Based on the linguistic scoring methodology, each artifact may be scored on a scale of 0% to 100%, as shown at 606 and 608. 0% may indicate most positive and 100% may indicate most negative.

It should be appreciated that a polarity-based scale may include two opposite emotions, whether positive and negative, happy and sad or any other suitable opposite emotions. Therefore, each artifact scored on a polarity-based score may be given a score based on the polarity of the artifact. However, at times, in order to compensate for the shortcomings of the polarity-based scoring models, an artifact may be scored on multiple polarity-based scoring models, and, the results of the scoring models may be combined.

FIG. 7 shows illustrative multi-dimensional scoring scale 702. Multi-dimensional scoring scale 702 may include a plurality of vectors. Each of the vectors may correspond to a different emotion or sentiment. The emotions, or sentiments shown, may include positive (704), encouraged (706), satisfied (708), happy (710) calm (712), assurance (714), unintelligent (716), prevented (718), negative (720), aggravated (722), frustrated (724), sad (726), anger (728), fear (730), intelligent (732) and promoted (736).

Vector 734 may be a vector generated from an artifact. The artifact may include a plurality of attributes. The artifact may be broken down into component parts. The attributes and the component parts may be used to plot the artifact on the multi-dimensional scoring scale.

The sentiment of the artifact plotted as vector 734 may be shown in-between intelligent and promoted. It should be appreciated that the multi-dimensional scoring scale may be used to determine the sentiment of an artifact. The multi-dimensional scoring scale may include a plurality of other emotions, not shown. In some embodiments, the multi-dimensional scoring scale may utilize any suitable emotion chart.

FIG. 8 shows multi-dimensional scoring scale 802. Multi-dimensional scoring scale 802 may be another scoring scale. Multi-dimensional scoring scale 802 may be a three-dimensional scoring scale. The three dimensions of multi-dimensional scoring scale 802 may include an x-dimension (horizontal), a y-dimension (vertical) and a z-dimension (depth). Vectors that represent emotions may be plotted on scoring scale 802.

A vector may have multiple dimensions, such as an x-dimension, a y-dimension and a z-dimension. As such, a vector plotted on scoring scale 802 may include an x-dimension, y-dimension and z-dimension. Multiple emotions may be plotted on scoring scale 802. Each plotted emotion may be represented by a vector, such as vector 804 that represents emotion 1, vector 806 that represents emotion 2, vector 808 that represents emotion 3 and vector 810 that represents emotion 4.

Build of a vector, or orientation of a vector, could be based on one or more of a combination of sentiments or emotions. In some embodiments, vector length could correspond to magnitude or intensity of a vector.

Each plotted vector that represents an emotion may have two extremes. For example, a vector may represent a range of happiness and sadness. Each point of the vector may represent a different extreme in the range of happiness and sadness. At the (0,0,0) point, the vector may represent neutrality (neither happy nor sad). Location points found on the vector above the (0,0,0) point may represent a gradually increasing degree of happiness, while location points found below the (0,0,0) point may represent a gradually increasing degree of sadness.

Upon the receipt of an unlabeled artifact, the artifact may be broken down into component parts. The component parts may be used to generate an artifact vector. The artifact vector may be plotted on a multi-dimensional scoring scale, such as scoring scale 802. Such an artifact vector may be shown at 812. Artifact vector 810 may represent the sentiment of artifact 1. Because the sentiment of an artifact may be multi-faceted—i.e., may include multiple emotions, vector 812 may represent the sentiment of artifact 1 with respect to the emotion vectors—i.e., vectors 804, 806, 808 and 810.

In some embodiments, the emotion vector, or vectors, that most closely represents the sentiment of the artifact may be displayed to a user. In certain embodiments, a detailed score comprising the various components of the artifact may be shown. For example, an artifact may be determined to include 20% happiness, 40% kindness, 30% caring and 10% consideration. For such an artifact, the entire breakdown may be shown and/or the single most dominant attribute kindness—may be shown. In some embodiments, the only displayed sentiment may be positive or negative.

Thus, a tunable system for monitoring threats to third-parties is provided. Persons skilled in the art will appreciate that the present invention can be practiced by other than the described embodiments, which are presented for purposes of illustration rather than of limitation. The present invention is limited only by the claims that follow.

What is claimed is:

1. A method for selecting a third-party from a plurality of third-parties by tunable monitoring of computer security threats to the plurality of third-parties and/or computer security threats from the plurality of third-parties, the method comprising: receiving, at a hardware processor operating on a computer, a request from a first entity, to select a third-party, from a plurality of third-parties, to satisfy an entity condition; mining and retrieving, by an application programming interface, a plurality of publicly-available artifacts, each artifact, included in the plurality of publicly-available artifacts, comprising: a specified third-party, said specified third-party being selected from the plurality of third-parties; an artifact source, said artifact source being one or more entities included in a plurality of entities or an anonymous entity; and a communication mode, said communication mode being selected from the group consisting of emails, instant messaging service messages, short messaging service messages and chats; organizing the plurality of artifacts into a plurality of artifact groups, each artifact group corresponding to one third-party, included in the plurality of third parties, removing one or more artifacts, from each artifact group included in the plurality of artifact groups, that include the anonymous entity as the artifact source, removing one or more artifacts, from each artifact group, included in the plurality of artifact groups, that correspond to a subset of entities that share less than a predetermined number of entity characteristics with the first entity; linguistically processing each artifact within each artifact group by: accessing an electronic key word and phrase library to characterize sentiment of each key word and/or phrase included in the artifact; accessing an electronic emoticon and emoji library to characterize sentiment of each emoji and/or emoticon included in the artifact; calculating a number of characters within the artifact; and calculating a response time between the artifact and related artifacts; generating, using a multi-dimensional scoring scale, a sentiment vector for each linguistically processed artifact within each artifact group, the sentiment vector identifies a correspondence between the linguistically processed artifact to the following emotions: intelligent, promoted, positive, encouraged, satisfied, happy, calm, assurance, unintelligent, prevented, negative, aggravated, frustrated, sad, anger and fear; combining, for each artifact group, the sentiment vectors generated for each linguistically processed artifact, into a combined sentiment vector; assigning, based on the combined sentiment vector, a sentiment score for each artifact group that corresponds to each of the third-parties, a higher sentiment score indicates positive sentiment, and a lower sentiment score indicates negative sentiment; receiving, at the hardware processor, the sentiment score for each of the plurality of third-parties; selecting, at the hardware processor, the third-party, from the plurality of third-parties, said third-party corresponding to the artifact group assigned a highest sentiment score, said third-party being identified as a selected third-party, the highest sentiment score indicating that the selected third-party is associated with more positive sentiment than the remaining third-parties included in the plurality of third-parties; for the selected third-party, selecting a most positive communication mode, from the group consisting of emails, instant messaging service messages, short messaging service messages and chats, that is most effective for communication between the selected third-party and the first entity, said selecting comprising: organizing, linguistically processed artifacts and assigned sentiment vectors, by communication mode; aggregating the sentiment vectors for each communication mode; and identifying the most positive sentiment vector; and selecting the most positive communication mode associated with the most positive sentiment vector; initiating, at the hardware processor, by the first entity, a relationship between the first entity and the selected third-party; routing communications between the selected third-party and the first entity on the most positive communication mode; determining, at the hardware processor, by the first entity, a scope of the a relationship between the first entity and the selected third-party; determining, at the hardware processor, by the first entity, a plurality of relationship characteristics relating to the relationship; mining, by the first entity, publicly-available data to determine public sentiment relating to the relationship characteristics; identifying, by the first entity, public sentiment relating to the publicly-available data; generating, by the first entity, a second score of the public sentiment relating to the publicly-available data; maintaining the relationship when the second score is less than a predetermined threshold; and dissolving the relationship when the second score is greater than a predetermined threshold.

2. The method of claim 1, further comprising displaying, on a dashboard, the scoring relating to the public sentiment of the publicly-available data.

3. The method of claim 1, further comprising identifying that the second score, is below the predetermined threshold.

4. The method of claim 3, wherein the predetermined threshold is a predetermined threshold of negativity.

5. The method of claim 1, further comprising identifying that the second score, is above the predetermined threshold.

6. The method of claim 1, further comprising displaying the second score on a dashboard.

7. The method of claim 6 wherein the sentiment vector further comprises the second score of the public sentiment relating to the relationship characteristics.

8. The method of claim 7, further comprising displaying the sentiment vector combined score on the dashboard.

9. A tunable monitoring system for selecting a third-party from a plurality of third-parties by detecting computer security threats to the plurality of third-parties, the system comprising: a receiver, operating in tandem with a hardware processor, the receiver operable to receive: entity characteristics relating to a first entity; and identification data identifying a third-party; a publicly-available data crawler, operating in tandem with the hardware processor, the data crawler operable to: mine and retrieve, by an application programming interface, a plurality of publicly-available artifacts data relating to each of the plurality of third-parties, said publicly-available data relating to an artifact source, said artifact source being one or more entities included in a plurality of entities or an anonymous entity; a communication mode, said communication mode being selected from the group consisting of emails, instant messaging service messages, short messaging service messages and chats; a specified third-party, the specified third-party being selected from the plurality of third-parties; and one or more of a plurality of entities, said plurality of entities comprising entities that share a predetermined threshold number of entity characteristics with the first entity; a sentiment analysis module operating in tandem with the hardware processor, operable to: for each third-party, score each of the retrieved publicly-available data artifacts using a multi-dimensional sentiment analysis scoring model, said multi-dimensional sentiment analysis scoring model operable to: linguistically process the artifact, said process operable to: access an electronic key word and phrase library to characterize sentiment of each key word and/or phrase included in the artifact, access an electronic emoticon and emoji library to characterize sentiment of each emoji and/or emoticon included in the artifact; calculate a number of characters within the artifact; and calculate a response time between the artifact and related artifacts; identify a correspondence between the artifact to the following emotions: intelligent, promoted, positive, encouraged, satisfied, happy, calm, assurance, unintelligent, prevented, negative, aggravated, frustrated, sad, anger and fear; for each artifact, generate a sentiment vector based on the score, a larger sentiment vector indicates positive sentiment, and a lower sentiment vector indicates negative sentiment; and for each third-party, combine the sentiment vectors into a combined sentiment vector; a selection module, operating in tandem with the hardware processor, operable to: select from among the plurality of third parties, a third party assigned a greatest combined sentiment vector; for the selected third-party, select, based on the sentiment vector and the communication mode of each artifact that relates to the selected third-party, a most positive communication mode, from the group consisting of emails, instant messaging service messages, short messaging service messages and chats, said most positive communication mode is most effective for communication between the selected third-party and the entity; a display module, operating in tandem with the hardware processor, operable to display the selected third-party; and an initiation module, operating in tandem with the hardware processor, operable to: initiate a relationship between the selected third-party and the first entity; and route communications between the selected third-party and the entity on the most positive communication mode.

10. The system of claim 9, wherein:
the receiver is further configured to receive relationship characteristics relating a potential relationship between the first entity and the third-party; and
the publicly-available data crawler is further configured to mine and retrieve publicly-available data relating to relationships between the third-party and one or more of the plurality of entities.

11. The system of claim 9, wherein the sentiment analysis model scores the retrieved publicly-available data based on:
natural language processing;
computational linguistics;
biometrics;
text analysis, the text analysis analyzing:
key words and phrases;
emoticons;
characters;
length of response;
response time between artifacts;
related artifacts;
negation;
exaggerations;
jokes; and/or
sarcasm.

12. The system of claim 9, wherein, upon identification that the score is above a predetermined negativity threshold, a potential relationship between the first entity and the third-party is dissolved.

13. The system of claim 9, wherein, upon identification that the score is below a predetermined negativity threshold, a potential relationship between the first entity and the third-party is initiated.

* * * * *